US009038652B1

(12) United States Patent
Henry

(10) Patent No.: US 9,038,652 B1
(45) Date of Patent: May 26, 2015

(54) INFLATABLE DEVICE

(71) Applicant: Andre Lee Lewis Henry, Brooklyn, NY (US)

(72) Inventor: Andre Lee Lewis Henry, Brooklyn, NY (US)

(*) Notice: Subject to any disclaimer, the term of this patent is extended or adjusted under 35 U.S.C. 154(b) by 106 days.

(21) Appl. No.: 13/901,650

(22) Filed: May 24, 2013

Related U.S. Application Data

(60) Provisional application No. 61/734,360, filed on Dec. 6, 2012.

(51) Int. Cl.
F16K 15/20 (2006.01)

(52) U.S. Cl.
CPC .................................. F16K 15/20 (2013.01)

(58) Field of Classification Search
USPC ........ 137/223, 232, 814, 825, 842; 273/58 R, 273/65 C, 65 D; 446/224; 473/610, 611
See application file for complete search history.

(56) References Cited

U.S. PATENT DOCUMENTS

| 1,329,559 | A | * | 2/1920 | Tesla ............................... 138/37 |
| 2,295,804 | A | * | 9/1942 | Olson ............................ 473/610 |
| 2,734,308 | A | * | 2/1956 | Gassaway ..................... 446/224 |
| 2,804,085 | A | * | 8/1957 | Di Geambeardino et al. ............................. 137/223 |
| 2,824,570 | A | * | 2/1958 | Silverman et al. ............ 137/223 |
| 3,220,729 | A | * | 11/1965 | Whittington .................. 473/575 |
| 5,083,581 | A | * | 1/1992 | Jaw ............................... 137/223 |
| 5,098,095 | A | * | 3/1992 | Weiss ............................ 473/593 |
| 5,265,636 | A | * | 11/1993 | Reed .............................. 137/14 |
| 5,915,407 | A | * | 6/1999 | West ............................. 137/223 |

* cited by examiner

Primary Examiner — Kevin Murphy
Assistant Examiner — R. K. Arundale
(74) Attorney, Agent, or Firm — IDP Patent Services; Olav M. Underdal

(57) ABSTRACT

An inflatable device is provided, comprising a carcass and an internal air intake mechanism assembly. The carcass defines a surface of the device and surrounds an inner volume of the device, and has an opening. The internal air intake mechanism assembly comprises a primary one way valve mechanism joined to the carcass to cover the opening. The primary one way valve mechanism extends into the inner volume and is configured for enabling air to be directed into inner volume from an environment external to the carcass, while preventing or limiting air flow from the inner to the external environment.

12 Claims, 10 Drawing Sheets

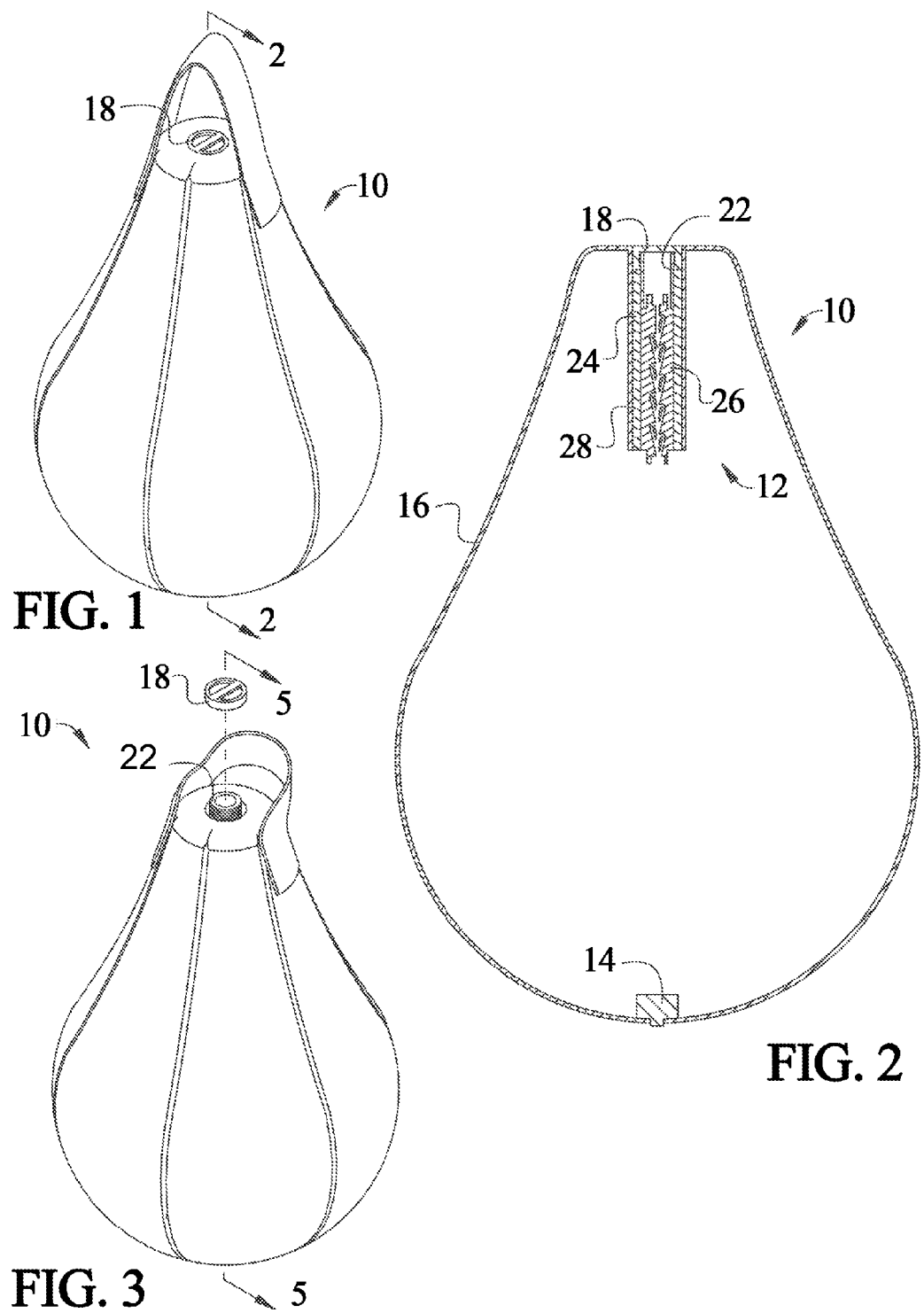

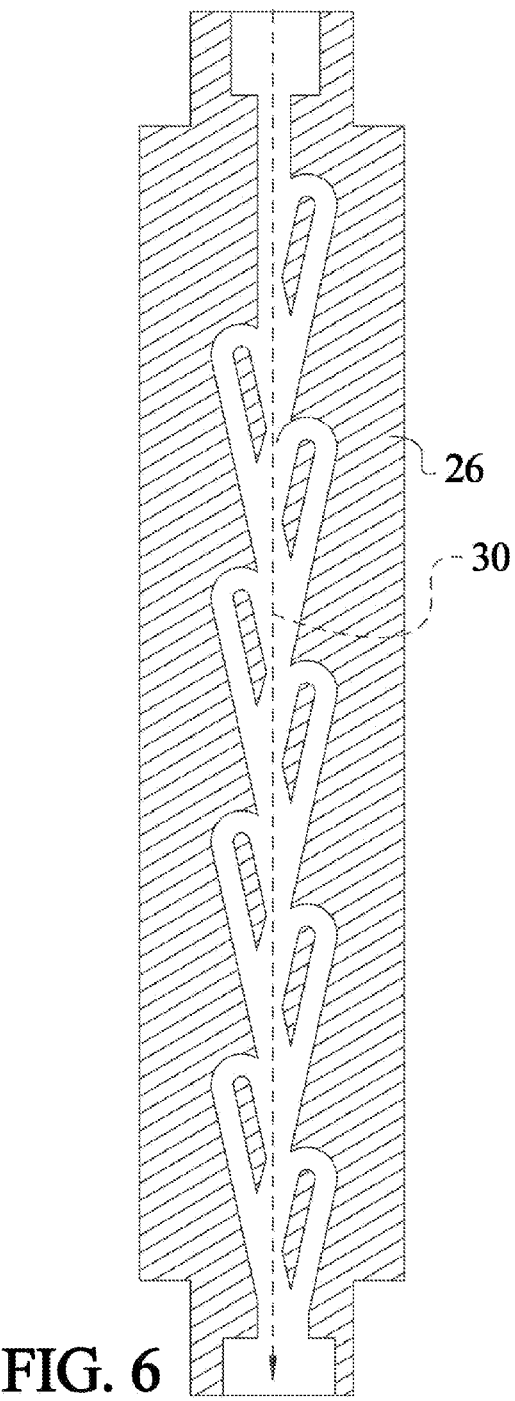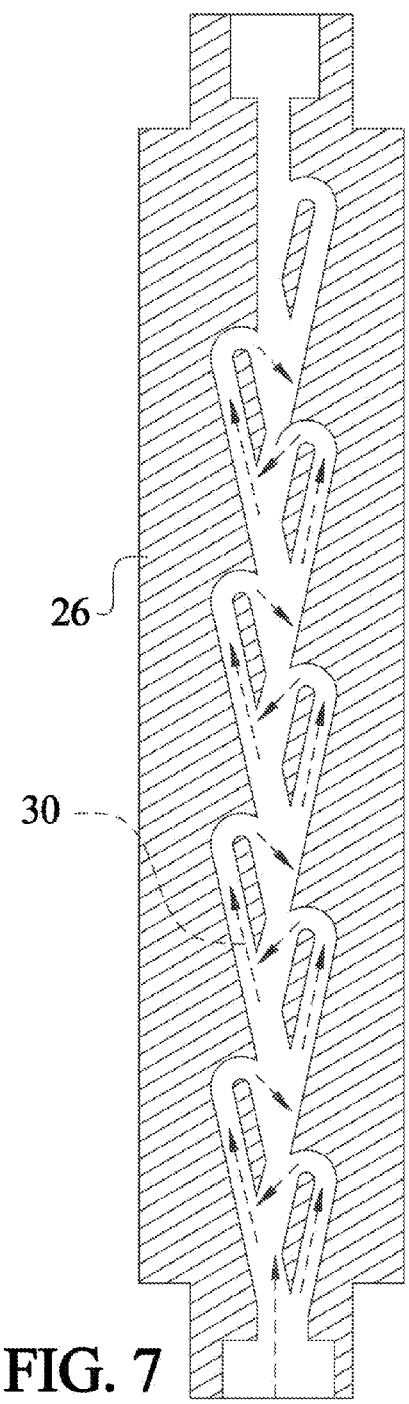

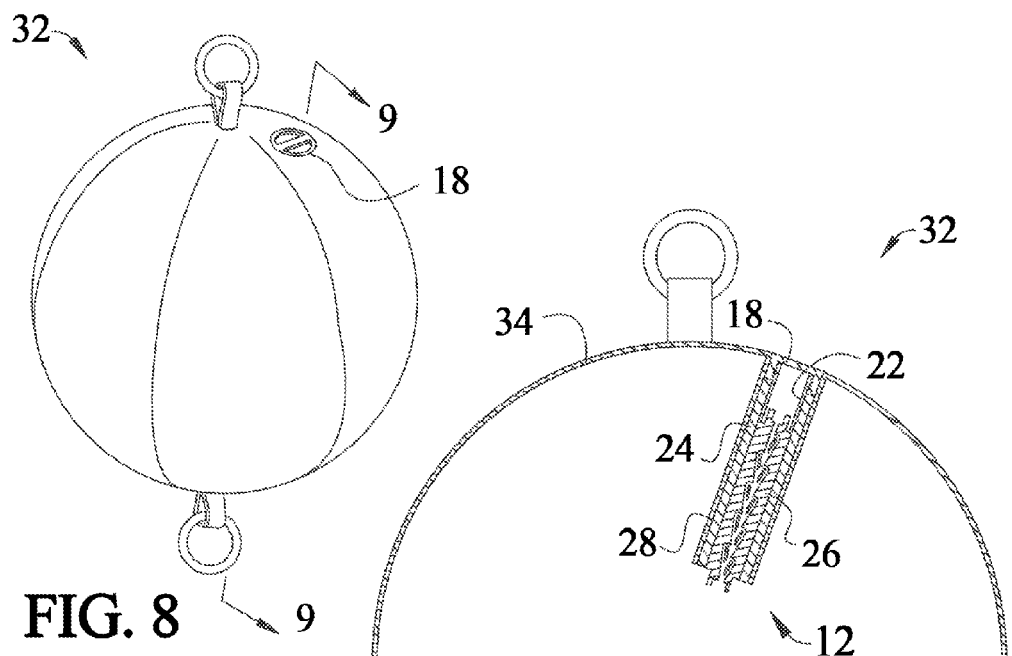
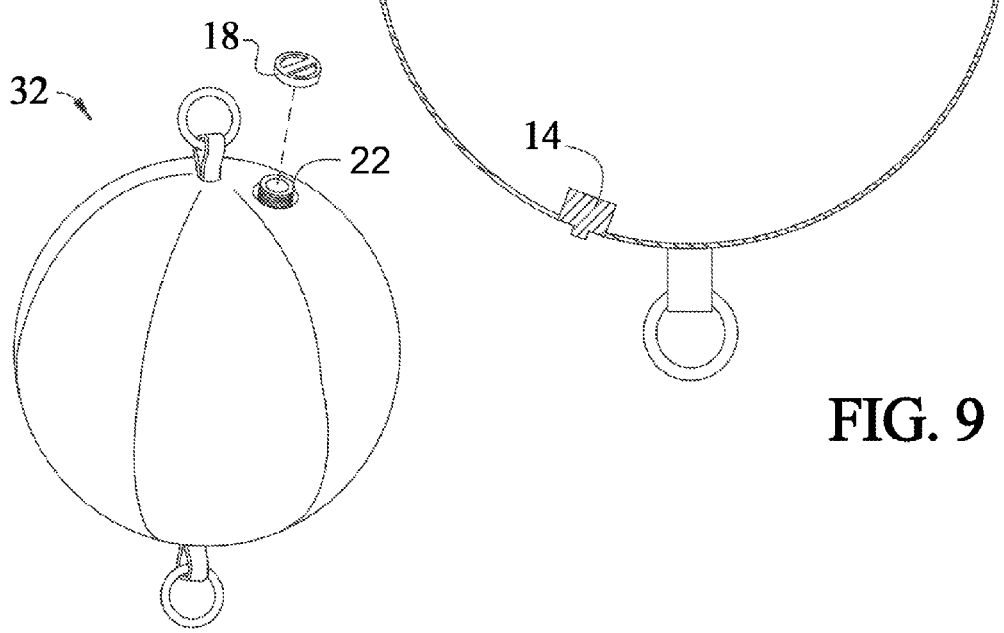
FIG. 8
FIG. 9
FIG. 10

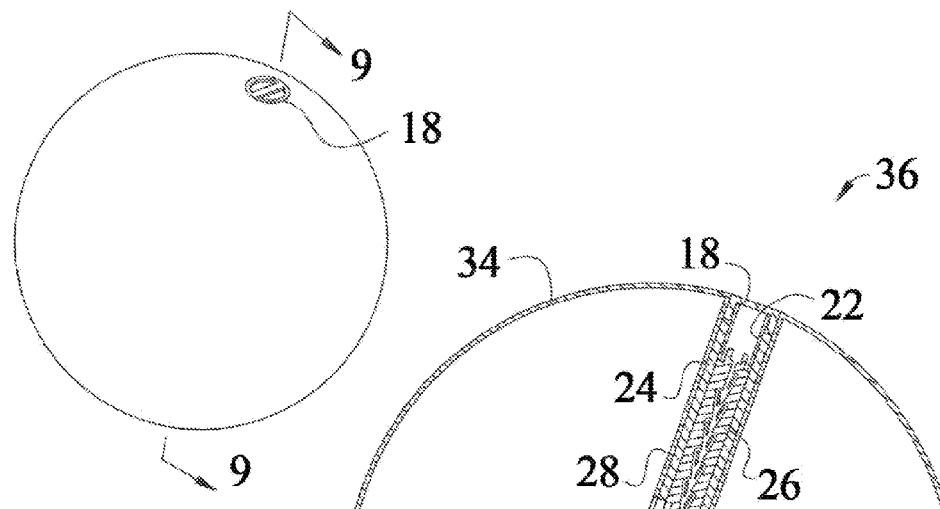
FIG. 14
FIG. 15
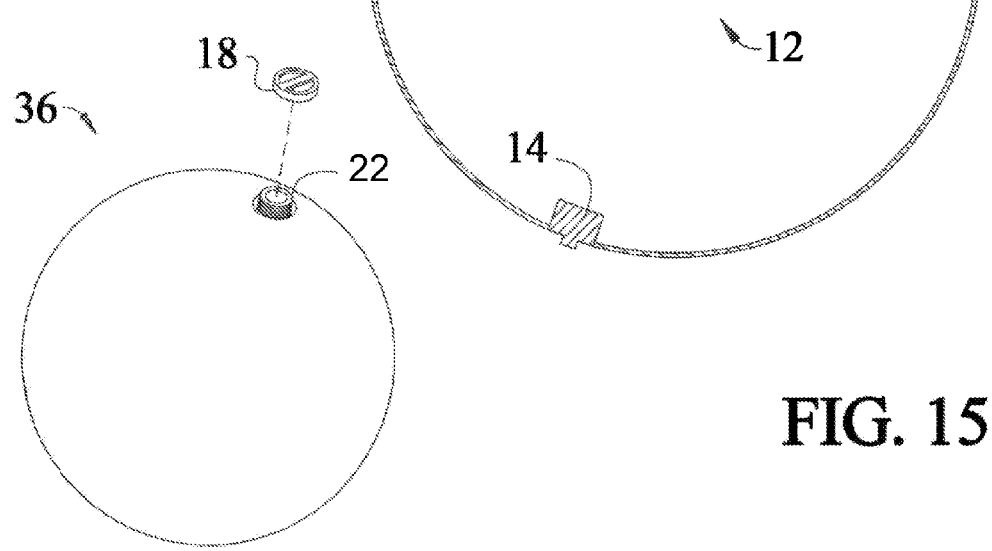
FIG. 16

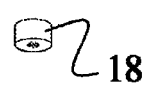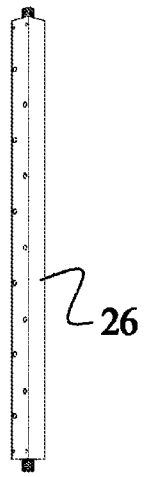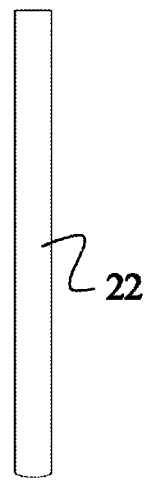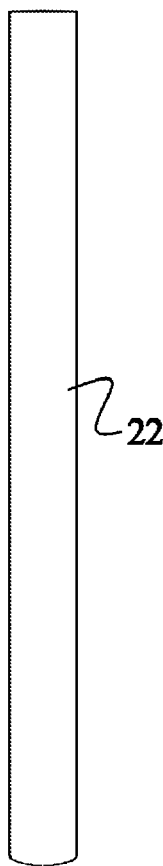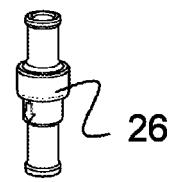
FIG. 17　　　　　　　　　FIG. 18

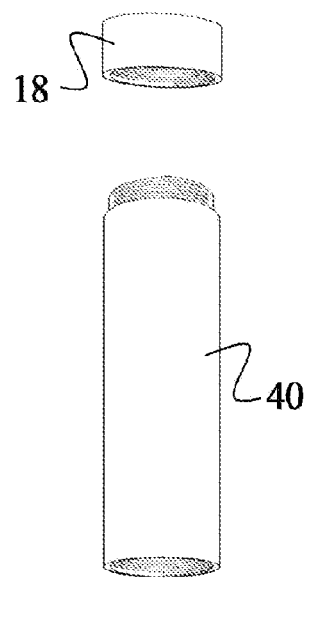
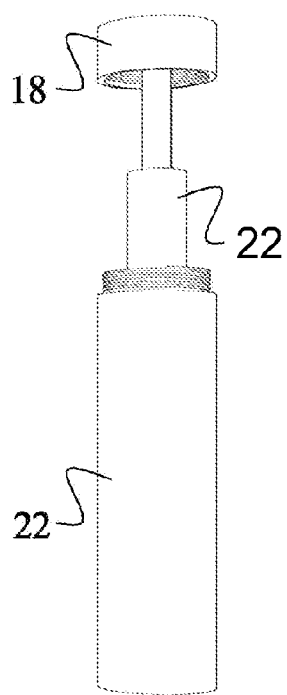
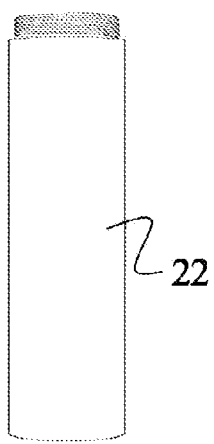
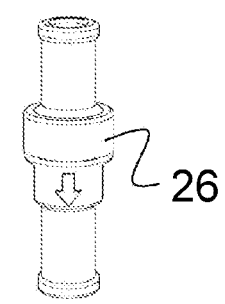
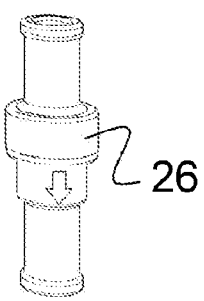
FIG. 20
FIG. 19

INFLATABLE DEVICE

CROSS-REFERENCES TO RELATED APPLICATIONS

The present application claims priority from U.S. Provisional Application Ser. No. 61/734,360 filed on Dec. 4, 2012, which is hereby incorporated herein by reference in its entirety.

TECHNICAL FIELD

The present invention, in some embodiments thereof, relates to exercise equipment accessories and, more particularly, to an internal mechanism for adding air to exercise bags and balls, such as a stability ball, speed bag, a double end bag, a slip ball or the like.

BACKGROUND OF THE INVENTION

In order to inflate conventional inflatable exercise equipment, such as a balls or bags (e.g. double end bags, slip balls, stability balls and speed bags), air is inserted into the inflatable equipment via a traditional inflation valve included in the equipment. To do this, an inflation needle is inserted into and through a self-sealing inflation valve of the inflatable equipment. A separate pump, such as a soccer ball pump, is connected to the inflation needle and the ball and/or bag are inflated using the pump. The inflation needle is then withdrawn from the inflation valve which self-seals to maintain the pressure which is done every time the ball needs to be pumped up.

In addition, inflatable exercise equipment (e.g., speed bags, double end bags, slip balls and stability balls) known in the art is not equipped with a pressure release valve. Thus when over-inflation of the bladder occurs, the bladder tends to pop.

Therefore, there is a need for an improved method for adding air to inflatable exercise equipment.

BRIEF SUMMARY OF EMBODIMENTS OF THE INVENTION

An aspect of some embodiments of the present invention relates to an inflatable device, which comprises a carcass and an internal air intake mechanism assembly. The carcass defines a surface of the device and surrounds an inner volume of the device, and having an opening. The internal air intake mechanism assembly comprises a primary one way valve mechanism joined to the carcass to cover the opening. The primary one way valve mechanism extends into the inner volume and is configured for enabling air to be directed into the inner volume from an environment external to the carcass, while preventing or limiting air flow from the inner to the external environment.

In a variant, the primary one way valve mechanism is flush with the surface of carcass.

In another variant, the primary one way valve mechanism protrudes from the surface of the carcass into the external environment.

In yet another variant, the carcass includes a tube extending into the inner volume. The tube having an inner opening within the inner volume and an outer opening corresponding to the opening of the carcass, such that the inner volume is in fluid communication with the external environment via the tube. The primary one way valve mechanism is located within the tube, is sealingly joined to an inner surface of the tube, and is configured for enabling air to be directed into inner volume from an environment external to the carcass via the tube, while preventing or limiting air flow from the inner volume to the external environment via the tube.

In a further variant, the air intake mechanism assembly comprises a sleeve configured for lining the inner surface of the tube and holding the primary one way valve mechanism by the sleeve.

In yet a further variant, the primary valve mechanism is recessed within the tube, leaving a hollow space between the outer opening of the tube and an edge of the primary one way valve mechanism.

Optionally, the air intake mechanism assembly comprises a retractable mechanism located in the hollow space between the outer opening of the tube and an edge of the primary one way valve mechanism the retractable mechanism being a channel having two openings and being slidable along the inner surface of the tube, to protrude into the external environment from the tube's outer opening.

The device may comprise a cap adapted to close the outer opening of the tube, the cap being joined to the retractable mechanism when the cap closes the outer opening of the tube, so as to enable the lifting of the retractable mechanism into the external environment by pulling on the cap.

In a variant, the device comprises a cap adapted to close the opening of the carcass.

In another variant, the device comprises a counterbalance unit weighed to counterbalance a weight of the internal air intake mechanism assembly.

Optionally, the counterbalance unit is weighed to counterbalance a weight of the internal air intake mechanism assembly, where the internal air intake mechanism assembly may include the primary one way valve mechanism, or the primary one way valve mechanism and the sleeve, or the primary one way valve mechanism, the sleeve, and the retractable mechanism.

In yet another variant, the carcass has a second opening and the device comprises an internal air pressure release valve covering the second opening and configured to permit air to escape from the second opening if air pressure within the inner volume is higher than a threshold pressure.

The internal air pressure release valve may be weighed to counterbalance a weight of the internal air intake mechanism assembly.

In a further variant, the inflatable device comprises a secondary one way valve mechanism joined to the primary one way valve mechanism and facing the inner volume, the secondary one way valve mechanism being configured for enabling air exiting the primary one way valve mechanism to be directed into the inner volume, while preventing or limiting air flow from the inner volume to the external primary one way valve mechanism.

The secondary one way valve mechanism may comprise a duckbill valve.

In yet a further variant, the internal air intake mechanism assembly is removably joined to the carcass.

In some embodiments of the present invention, the primary valve mechanism comprises a Tesla valve.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1 is a perspective view of an exercise bag according to some embodiments of the present invention;

FIG. 2 is a cross sectional view of the exercise bag of FIG. 1;

FIG. 3 is a partially exploded perspective view of the exercise bag of FIG. 1, showing a retractable mechanism protruding out of the opening and having a cap removed;

FIG. 6 is a detailed cross sectional view of a one-way valve, illustrating air flow into the exercise bag of FIG. 1;

FIG. 7 is a detailed cross sectional view of the one-way valve of FIG. 6, illustrating air flow out of the exercise bag being restricted;

FIG. 8 is a perspective view of a double end bag according to an exemplary embodiment of the present invention;

FIG. 9 is a cross sectional view of the double end bag of FIG. 8;

FIG. 10 is a partially exploded perspective view of the double end bag of FIG. 8, showing a cap removed;

FIGS. 14-16 illustrate an inflatable exercise ball of the present invention, in which the one-way valve is joined to a secondary valve;

FIG. 17 is a perspective drawing illustrating an example of the connection between the primary one way valve, the retractable mechanism and the secondary one way valve of FIGS. 14-16;

FIG. 18 is a perspective drawing illustrating an example of a connection between the retractable mechanism and the primary one way valve, where the primary one way valve is a duckbill valve;

FIG. 19 is a perspective drawing illustrating an conduit joined to the retractable mechanism;

FIG. 20 is a perspective drawing showing the retractable mechanism in its extended mode;

Figure 4:
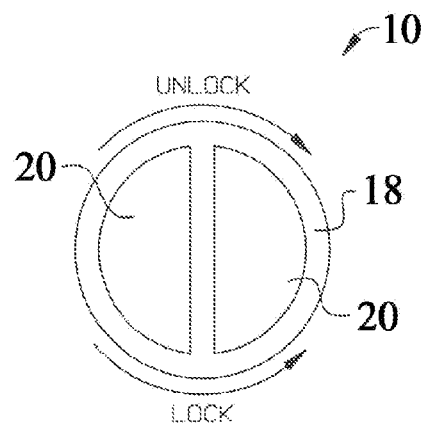
FIG. 4 is a top view of the cap of the exercise bag of FIGS. 1-3.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Before describing aspects of the present invention, elements illustrated in the drawings will be now listed along with the corresponding reference numerals:

10 speed bag;
12 internal mechanism assembly;
14 internal pressure release valve;
16 speed bag carcass;
18 cap;
20 groove of cap;
22 retractable mechanism;
24 sleeve;
26 primary one way valve mechanism;
28 outer tube;
30 blockage of air flow;
32 double end bag;
34 double end bag and stability ball carcass;
36 stability ball;
38 secondary one way valve mechanism;
40 conduit.

Broadly, an embodiment of the present invention provides an inflatable device (e.g., an exercise ball such as a stability ball, fitness ball, body ball (or the like) or an exercise bag such as a boxing bag, slip ball, speed bag and double end bag) with a self-contained internal inflation mechanism. The internal mechanism is intended to allow a user to drive or blow air into the inflatable device without the need for a separate inflation needle being inserted directly into the inflatable device.

More particularly, the invention relates to inflatable exercise devices (e.g., stability balls, double end bags, slip balls and speed bags) that have a self-contained internal mechanism that is operable from outside of the device and which allows the user to drive or blow air into the device in order to achieve a desired air pressure inside the device. Additionally, the internal mechanism provides a chamber within the device with the means for allowing air into the chamber while not allowing air to be released. This is achieved via at least one one-way valve into the interior of the device. The internal mechanism is accessible to the user externally so that it is more convenient for them to use.

Referring now to FIGS. 1 through 13, an inflatable device is illustrated, such as a speed bag 10 or a double end bag 32 or a stability ball 36 (or another kind of an exercise bag or ball), that includes an internal air intake mechanism assembly 12 for allowing air into the exercise bag and ball.

Figure 24:
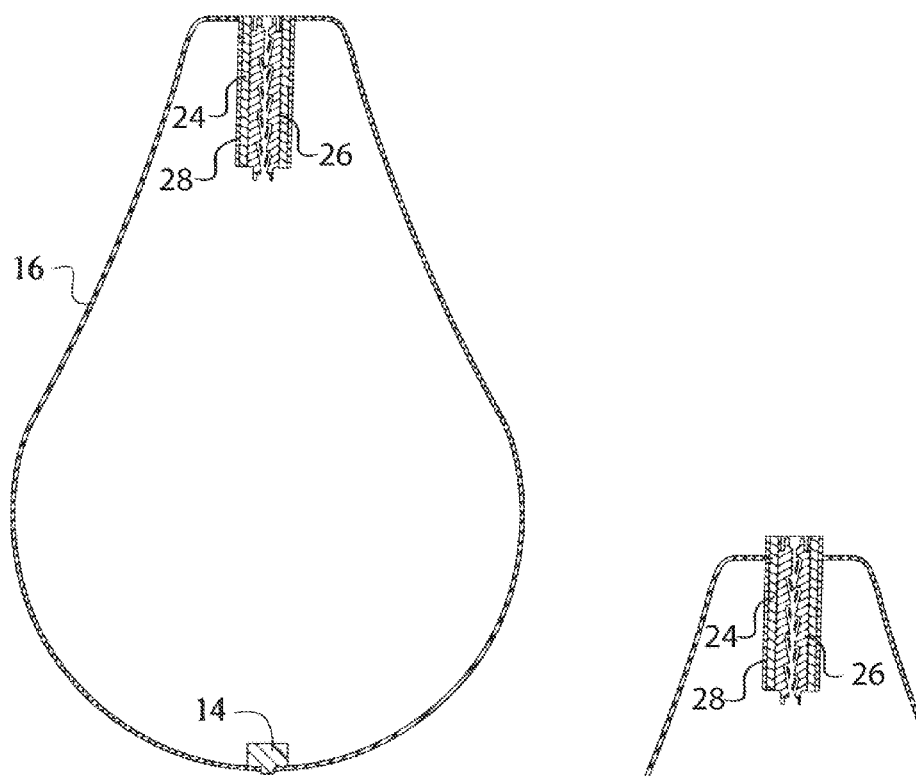
FIG. 24 is a cross sectional view of an exercise bag, wherein the primary one way valve mechanism is flush with the surface of the carcass, according to some embodiments of the present invention.
Figure 25:
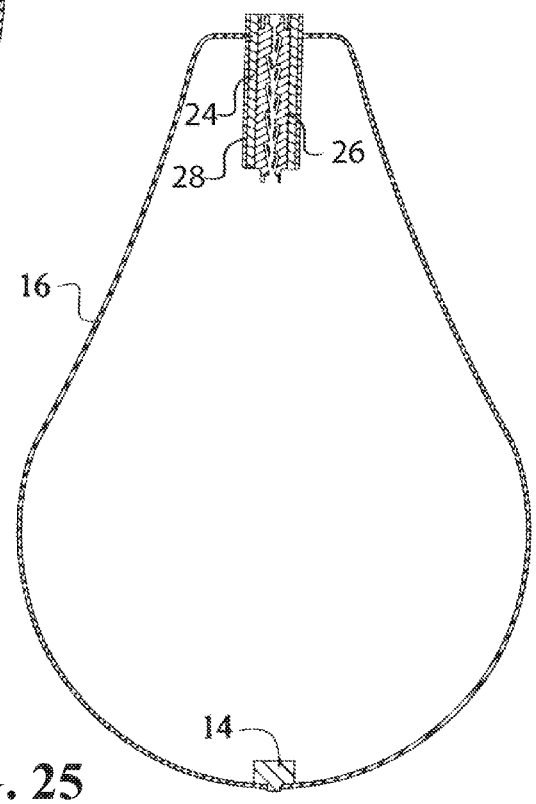
FIG. 25 is a cross sectional view of an exercise bag, wherein the primary one way valve mechanism protrudes from the surface of the carcass into the external environment, according to some embodiments of the present invention.

The device includes a carcass 16 having an opening and an internal air intake mechanism assembly 12. The internal air intake mechanism assembly 12 includes a primary one way valve mechanism 26. In a variant, the primary one way valve mechanism 26 is joined to carcass to cover the opening on the carcass 16 of the inflatable device. The primary one way valve mechanism 26 enables air to be directed into the inner volume of the inflatable device from the environment external to the inflatable device, while preventing or limiting air flow from the inner volume into the external environment. The primary valve mechanism 26 may be flush with the surface of the carcass, or may protrude therefrom into the external environment, as shown in respectively FIGS. 24 and 25.

The primary valve mechanism 26 may include any kind of one-way valve, such as a Tesla valve or a duckbill valve, for example.

In another variant, the inflatable device includes an outer tube 28 integral with the carcass and extending into the device's inner volume from the opening. Thus, the outer tube 28 has an outer opening on the surface of the inflatable device and an inner opening inside the inflatable device. The outer opening of the tube 28 corresponds to the opening of the carcass. Via the outer tube 28, the inner volume of the device is in fluid communication with an environment external to the device. The primary valve mechanism 26 is sealingly joined to the inner surface of the outer tube 28.

The air intake mechanism assembly 12 may include a sleeve 24 lining an inner surface of the outer tube 28. The primary one way valve mechanism 26 is fitted into the outer tube 28 and held in position by the sleeve 24. The primary one way valve mechanism may include any known type of one way valve. In some embodiments of the present invention, the primary valve mechanism 26 includes a sealing material having a cavity which opens to the inner volume of the device and to the environment external to the device. The sealing material may be made of rubber or a water proof material, and is configured to block airflow 30 from leaving primary the device via the one way valve mechanism 26 (see FIG. 7). When the air comes in with sufficient pressure, the only place for the air to go is into the primary one way valve mechanism 26 which allows the air to go through and inflate the exercise inflatable device (see FIG. 6). While in FIGS. 1-13 the primary valve mechanism is shown to be a Tesla valve, FIGS. 18-23 illustrate an example in which the primary valve mechanism 26 is a duckbill valve.

In some embodiments of the present invention, the primary valve mechanism 26 is recessed within the outer tube 28 (or the sleeve 24, if present), leaving a hollow space between the outer opening of the tube and an edge of the primary one way valve mechanism. In a variant, the air intake mechanism assembly 12 further includes a hollow removable attachment that has a first opening facing the primary valve mechanism 26 and a second opening to the external environment. The removable attachment may be joined to the outer tube 28 in order to enable access to the air intake mechanism assembly 12 from outside of the inflatable device. Once access is no longer needed, the removable attachment can be detached from the outer tube 28.

Figure 5:
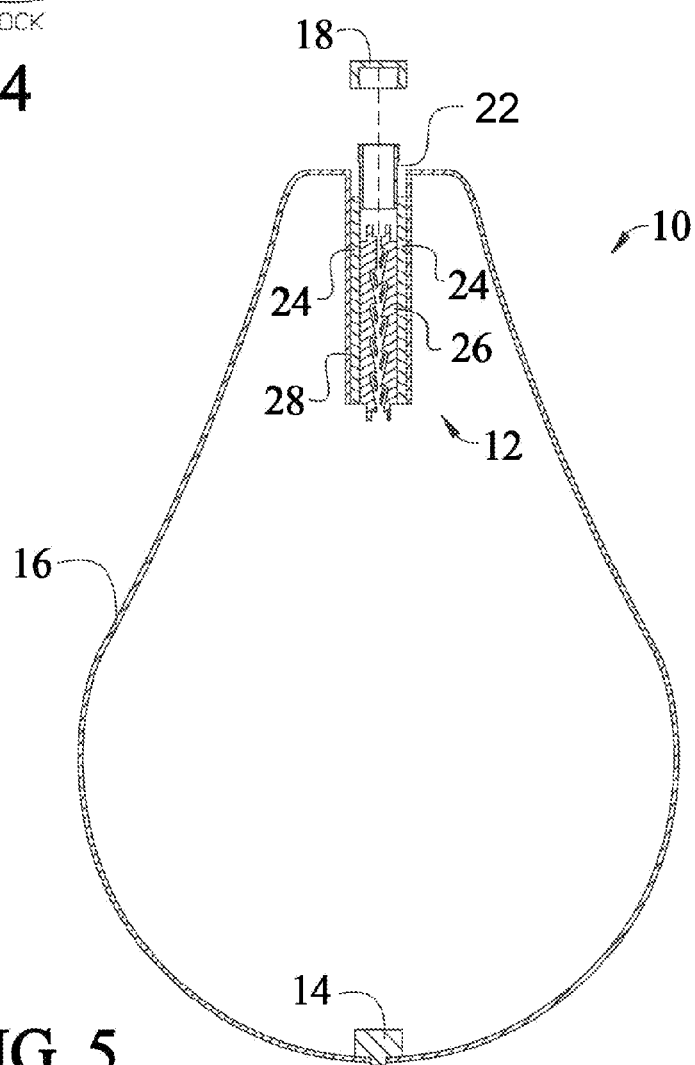
FIG. 5 is a cross sectional view of the exercise bag of FIG. 3.
Figures 11, 12, 13:
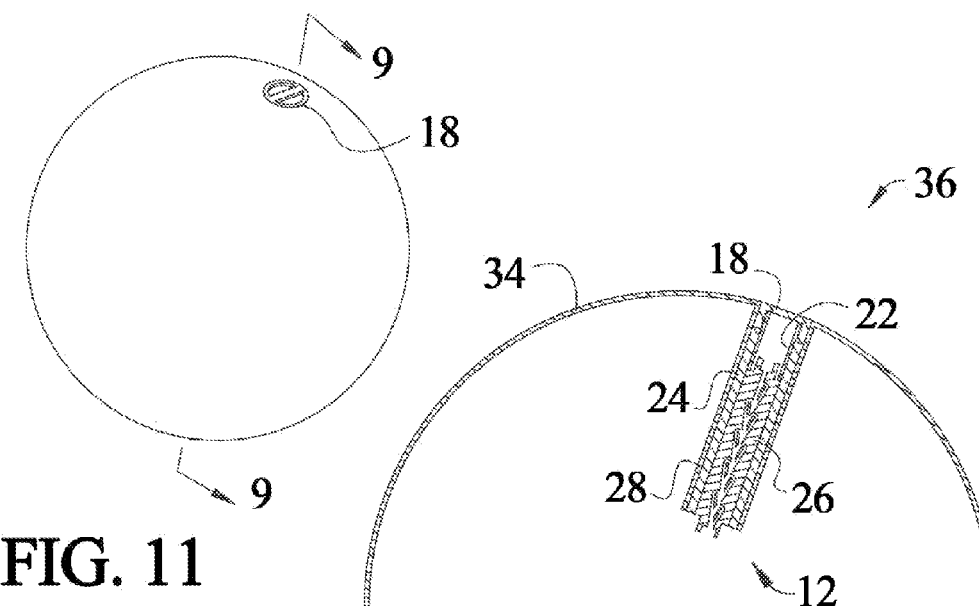
FIG. 11 is a perspective view of a stability ball according to an exemplary embodiment of the present invention.
FIG. 12 is a cross sectional view of the stability ball of FIG. 11.
FIG. 13 is a partially exploded perspective view of FIG. 11 showing a cap removed.
Figure 21:
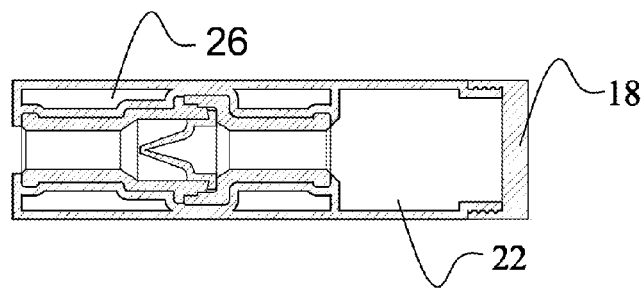
FIG. 21 is a detailed cross sectional view of an internal mechanism assembly which includes a duckbill valve as the primary one way valve and a retractable mechanism its retracted mode, according to some embodiments of the present invention.

Optionally the inflatable device includes a retractable mechanism 22 joined to the outer tube 28 (or the sleeve 24, if present) and located between the outer opening of the outer tube and the primary valve mechanism 26. The retractable mechanism 22 is a channel having two openings, and is slidable along the inner surface of the outer tube 28 (or the sleeve 24, if present) to protrude out of the device via the outer tube's outer opening. In this manner, the retractable mechanism 22 can be accessed from outside by the user or by an outer inflation unit (e.g. pump) for driving air via the retractable mechanism 22 and the primary valve mechanism 26 into the inflatable device's inner volume, as shown in FIG. 5.

In a variant, the inflatable device includes a cap 18 adapted to fit on the opening of the carcass (or the outer opening of the tube 28, if the tube is present) and to close the inflatable device, thereby decreasing even more the amount of air leaving the inflatable device. Optionally, when the cap 18 closes the outer opening of the tube 28, the cap 18 is joined to the retractable mechanism 22. Thus, the cap may be pulled outward before being removed to lift the retractable mechanism 22 to protrude out of the inflatable device.

Figure 22:
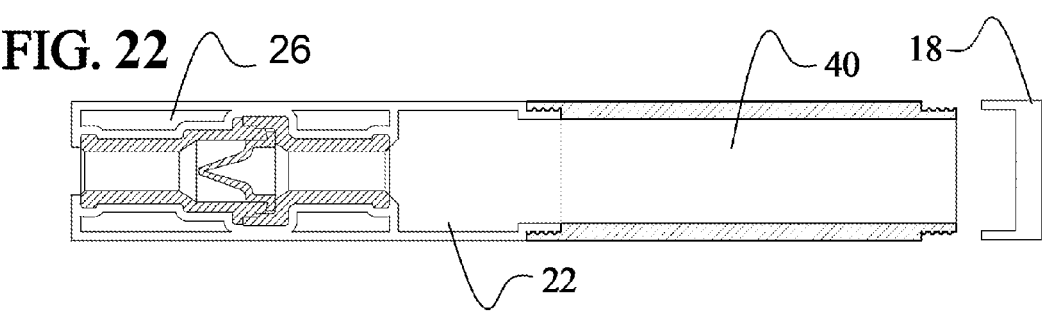
FIG. 22 is a detailed cross sectional view of an embodiment of the present invention in which a conduit is located between the retractable mechanism and the cap.
Figure 23:
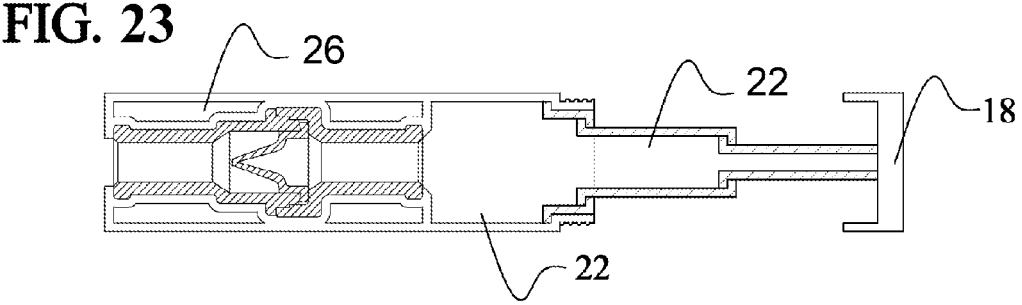
FIG. 23 is a detailed cross sectional view of an internal mechanism assembly which includes a duckbill valve as the primary one way valve and a retractable mechanism its extended mode, according to some embodiments of the present invention.

Optionally, a conduit is 40 joined to the retractable mechanism 22 and the cap 18, as illustrated in FIGS. 19 and 22. The conduit 40 increases the length of the internal air intake mechanism assembly 12, in order to ensure that the internal air intake mechanism assembly 12 fits within a given outer tube. The conduit 40 is removably joinable to retractable mechanism 22 and the cap 18. In this manner, a user may choose whether or not to join the conduit 40 to the retractable mechanism 22 and the cap 18, enabling the user to select the length of the air intake mechanism assembly 12. Optionally, a plurality of conduits 40 having different lengths are provided, to enable the user to vary the length of the air intake mechanism assembly 12 according to the user's need. As mentioned above, the user may pull the cap to extend the retractable mechanism 22. If the conduit is present, the user pulls the cap, and the cap pulls the conduit 40 outward toward the external environment. The retractable mechanism is pulled by the conduit 40 and is extended.

Optionally, the inflatable device includes a counterbalance unit weighed to counterbalance the weight of the internal mechanism air intake mechanism assembly 12. The counterbalance unit may be joined to the internal or external surface of the carcass.

The carcass 16 may have a second opening covered by an internal air pressure release valve 14. The internal air pressure release valve 14 is configured to permit air to escape from the second opening if the inflatable device becomes over inflated (i.e. if the air pressure within the inner volume is higher than a threshold pressure). The internal air pressure release valve 14 serve as the counterbalance unit.

As shown in FIGS. 14-17, optionally a secondary one way valve mechanism 38 may be joined to the inner end of the one way valve mechanism 26 to further prevent release of air from the device's inner volume to the environment external to the device. In this manner, the amount of air that is able to be retained inside of the inflatable device may be increased. The secondary valve mechanism 38 may include a valve which is of the same type as the valve of the primary valve mechanism 26, or a valve of a different type. According to a non-limiting example, the primary valve mechanism 26 may include a Tesla valve or any other type of one way valve while the secondary valve mechanism 38 may include a duckbill valve or any other type of one way valve.

Optionally, the air intake mechanism assembly 12 is removably joined to the carcass. In this manner, the air intake mechanism assembly 12 may be joined to the carcass in order to inflate the carcass and keep the carcass inflated for a workout. When the inflatable device is not in use or is to be stored, the air intake mechanism assembly 12 may be removed from the carcass, causing the carcass to deflate.

The inflatable device can take on various forms of construction. Typically, a carcass 16, which is a term used herein to include all the various layers of the inflatable device, includes a rubber bladder for air-retention, a layer coating the bladder and being composed of sheets of nylon or polyester yarn, windings wrapped around the bladder, and an outer rubber layer in order to maximize air retention. In addition, the carcass can also include an additional outer layer of leather or a synthetic which is applied by adhesive and set by pressure during a cold molding process. The windings can be randomly oriented and may be in the form of two or three layers so as to prevent extension of the inflatable device beyond a certain volume, restricting the inflatable device from expanding to any significant extent above its intended size when inflated above its intended pressure. This layer formed by windings, for inflatable devices such as stability balls, slip balls, double end bags and speed bags, is referred to as a lining layer and is usually composed of cotton or polyester cloth that embodies a flexible binder resin such as vinyl or latex rubber.

It should be noted that the inflatable device of the present invention as described above may be a stability ball, double end bag, slip ball/bag, speed bag, and any bag or ball intended for use during a workout such as a boxing, kickboxing, martial arts or a traditional personal training workout such as a one on one Pilates workout or the like.

It should be understood, of course, that the foregoing relates to exemplary embodiments of the invention and that modifications may be made without departing from the spirit and scope of the invention as set forth in the following claims.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An inflatable device, comprising:
a carcass defining a surface of the device and surrounding an inner volume of the device, and having an opening; and
an internal air intake mechanism assembly, which comprises a primary one way valve mechanism joined to the carcass to cover the opening, the primary one way valve mechanism extending into the inner volume and being configured for enabling air to be directed into the inner volume from an environment external to the carcass, while preventing or limiting air flow from the inner volume to the external environment;
wherein the carcass includes a tube extending into the inner volume, the tube having an inner opening within the inner volume and an outer opening corresponding to the opening of the carcass, such that the inner volume is in fluid communication with the external environment via the tube;
wherein the primary one way valve mechanism is located within the tube, is sealingly joined to an inner surface of the tube, and is configured for enabling air to be directed into the inner volume from an environment external to the carcass via the tube, while preventing or limiting air flow from the inner volume to the external environment via the tube;
wherein the primary valve mechanism is recessed within the tube, leaving a hollow space between the outer opening of the tube and an edge of the primary one way valve mechanism;
wherein the air intake mechanism assembly comprises a retractable mechanism located in the hollow space between the outer opening of the tube and the edge of the primary one way valve mechanism, the retractable mechanism being a channel having two openings and being slidable along the inner surface of the tube, to protrude into the external environment from the tube's outer opening.

2. The inflatable device of claim 1, wherein the air intake mechanism assembly comprises a sleeve configured for lining the inner surface of the tube and holding the primary one way valve mechanism by the sleeve.

3. The inflatable device of claim 1, comprising a cap adapted to close the outer opening of the tube, the cap being joined to the retractable mechanism when the cap closes the outer opening of the tube, so as to enable the lifting of the retractable mechanism into the external environment by pulling on the cap.

4. The inflatable device of claim 1, comprising a cap adapted to close the opening of the carcass.

5. The inflatable device of claim 1, comprising a counterbalance unit weighed to counterbalance a weight of the internal air intake mechanism assembly.

6. The inflatable device of claim 1, wherein the carcass has a second opening and the device comprises an internal air pressure release valve covering the second opening and configured to permit air to escape from the second opening if air pressure within the inner volume is higher than a threshold pressure.

7. The inflatable device of claim 6, wherein the internal air pressure release valve is weighed to counterbalance a weight of the internal air intake mechanism assembly.

8. The inflatable device of claim 1, comprising a secondary one way valve mechanism joined to the primary one way valve mechanism and facing the inner volume, the secondary one way valve mechanism being configured for enabling air exiting the primary one way valve mechanism to be directed into the inner volume, while preventing or limiting air flow from the inner volume to the external primary one way valve mechanism.

9. The inflatable device of claim 8, wherein the secondary one way valve mechanism comprises a duckbill valve.

10. The inflatable device of claim 1, wherein the internal air intake mechanism assembly is removably joined to the carcass.

11. The inflatable device of claim 1, wherein the internal air intake mechanism assembly is removably joined to the tube.

12. The inflatable device of claim 1, wherein the primary valve mechanism comprises a Tesla valve.

* * * * *